US012005739B2

(12) United States Patent
Steenland (10) Patent No.: US 12,005,739 B2
(45) Date of Patent: Jun. 11, 2024

(54) MODULAR HUB COVER AND METHODS OF MAKING AND USING SAME (71) Applicant: John J. Steenland, Bethlehem, PA (US)

(72) Inventor: John J. Steenland, Bethlehem, PA (US)

(*) Notice: Subject to any disclaimer, the term of this patent is extended or adjusted under 35 U.S.C. 154(b) by 565 days.

(21) Appl. No.: 17/243,043

(22) Filed: Apr. 28, 2021

(65) Prior Publication Data

US 2021/0339563 A1 Nov. 4, 2021

Related U.S. Application Data (60) Provisional application No. 63/018,766, filed on May 1, 2020.

(51) Int. Cl.
B60B 7/20 (2006.01)
B60B 7/00 (2006.01)
B60B 7/06 (2006.01)
B60B 7/12 (2006.01)

(52) U.S. Cl.
CPC .............. B60B 7/20 (2013.01); B60B 7/0013 (2013.01); B60B 7/066 (2013.01); B60B 7/12 (2013.01); B60B 2320/10 (2013.01)

(58) Field of Classification Search
CPC .......... B60B 7/0013; B60B 7/066; B60B 7/20
See application file for complete search history.

(56) References Cited

U.S. PATENT DOCUMENTS

| 5,190,354 | A | * | 3/1993 | Levy | B60B 7/20 40/587 |
| 5,876,099 | A | * | 3/1999 | Irgens-Moller | B60B 7/14 301/108.4 |
| 5,957,542 | A | * | 9/1999 | Boothe | B60B 7/20 301/108.4 |
| 6,048,036 | A | * | 4/2000 | Alaoui | B60B 7/14 301/108.4 |
| 7,168,831 | B2 | * | 1/2007 | Cho | B60B 7/006 362/500 |
| 7,396,087 | B1 | * | 7/2008 | Baker | B60B 7/04 301/37.24 |
| 8,517,474 | B2 | * | 8/2013 | Salah | B60B 7/20 301/37.25 |
| 10,543,716 | B1 | * | 1/2020 | Mavrofrides | B60B 7/066 |
| 2002/0125761 | A1 | * | 9/2002 | Matushita | B60B 7/20 301/37.25 |
| 2015/0170558 | A1 | * | 6/2015 | Salah | B60B 7/0053 301/5.22 |
| 2016/0159142 | A1 | * | 6/2016 | Whitten | B60B 7/0013 301/108.1 |
| 2020/0247179 | A1 | * | 8/2020 | Christensen | B60B 7/04 |

* cited by examiner

Primary Examiner — Jason R Bellinger
(74) Attorney, Agent, or Firm — James R. McDaniel (57) ABSTRACT A modular hub cover which includes a removable hub cover ring having a plurality of hub cover ring openings located around a periphery of the removable hub cover ring, a removable barrel having a first end and a second end, wherein the first end of the removable barrel is operatively attached to the removable hub cover ring, a removable insert located within the removable hub cover barrel and located adjacent to the second end of the removable barrel, and a retaining ring located within the removable hub cover barrel and located adjacent to the billet insert in order to retain the insert within the removable barrel.

17 Claims, 6 Drawing Sheets

MODULAR HUB COVER AND METHODS OF MAKING AND USING SAME

CROSS-REFERENCE TO RELATED APPLICATION

This application is a continuation-in-part of U.S. Patent Application 63/018,766, filed on May 1, 2020, the disclosure of which is hereby incorporated by reference in its entirety to provide continuity of disclosure to the extent such a disclosure is not inconsistent with the disclosure herein.

FIELD OF THE INVENTION

The present invention is generally related to a modular hub cover. The modular hub cover is a novel, easy-to-install, interchangeable hub cover that can be attached over a hub of a motor vehicle wheel such as the wheel of a pickup truck. The modular hub cover is securely attached to the motor vehicle wheel through the use of socket head cap screws. The modular hub cover includes a removable, interchangeable, customizable hub cover barrel that can be easily removed from the modular hub cover. The modular hub cover can also include a customizable insert that can be removably secured into one end of the hub cover barrel. Finally, in an alternative embodiment, the insert can be made to be rotatable within hub cover barrel.

BACKGROUND OF THE INVENTION

Prior to the present invention, as set forth in general terms above and more specifically below, it is known in the motor vehicle art, especially the pickup truck art, to use pickup truck hub covers that are secured over the pickup truck wheel hub. While these pickup truck hub covers are satisfactory, these pickup truck hub covers are not modular and are not interchangeable. In particular, the known pickup truck hub covers are secured to the pickup truck wheel by using socket head cap screws. However, if it is desired to install another different pickup truck hub cover, the previous pickup truck hub cover must be completely removed from the pickup truck wheel and the new pickup truck hub cover needs to be installed onto the pickup truck wheel. This clearly requires a great amount of time and effort to remove all four (4) of the old pickup truck hub covers and install the new pickup truck hub covers.

It is a purpose of this invention to fulfill these and other needs in the motor vehicle wheel hub cover art in a manner more apparent to the skilled artisan once given the following disclosure.

The preferred modular hub cover according to various embodiments of the present invention, offers the following advantages: ease of use; durability; the ability to quickly and easily interchange one hub cover for another hub cover; the ability to customize the hub cover; the ability to customize the insert; the ability of the insert to rotate within the hub cover barrel; and the ability to add other accessories to the hub cover. In fact, in many of the preferred embodiments, these advantages are optimized to an extent that is considerably higher than heretofore achieved in prior, known motor vehicle wheel hub covers.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which.

DETAILED DESCRIPTION OF THE PREFERRED EMBODIMENTS OF THE INVENTION

In order to address the shortcomings of the prior, known motor vehicle wheel hub covers, it would be desirable to utilize a novel, easy-to-install, interchangeable, modular hub cover that can be attached over a hub of a motor vehicle wheel such as the wheel of a pickup truck. The modular hub cover is securely attached to the motor vehicle wheel through the use of socket head cap screws. The modular hub cover includes a removable, interchangeable, customizable hub cover barrel that can be easily removed from the modular hub cover. The modular hub cover can also include a customizable insert that can be removably secured into one end of the hub cover barrel. Finally, in an alternative embodiment, the insert can be made to be rotatable within hub cover barrel.

Figure 1:
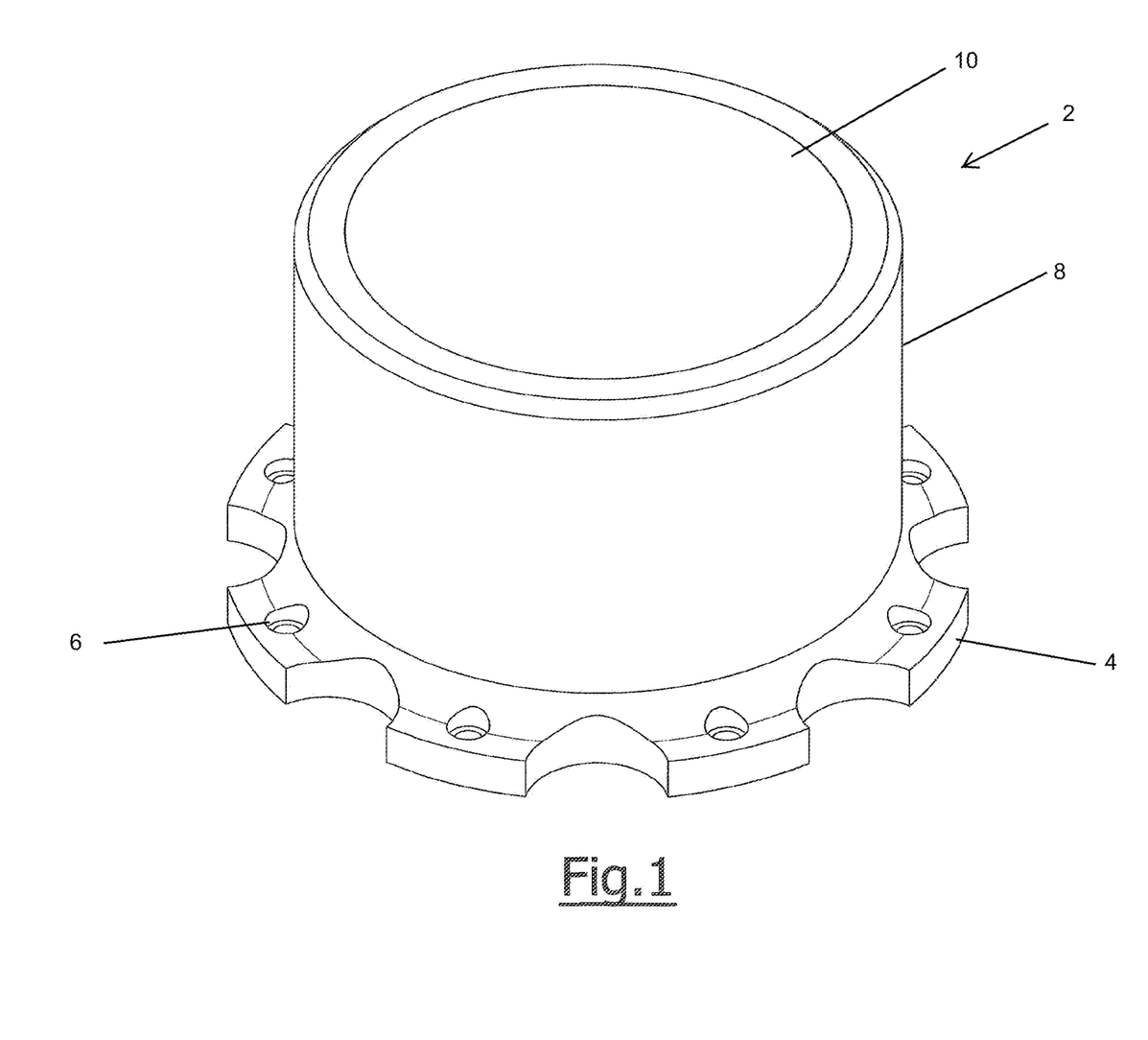
FIG. 1 is an isometric, schematic illustration of a modular hub cover, constructed according the present invention.
Figure 6:
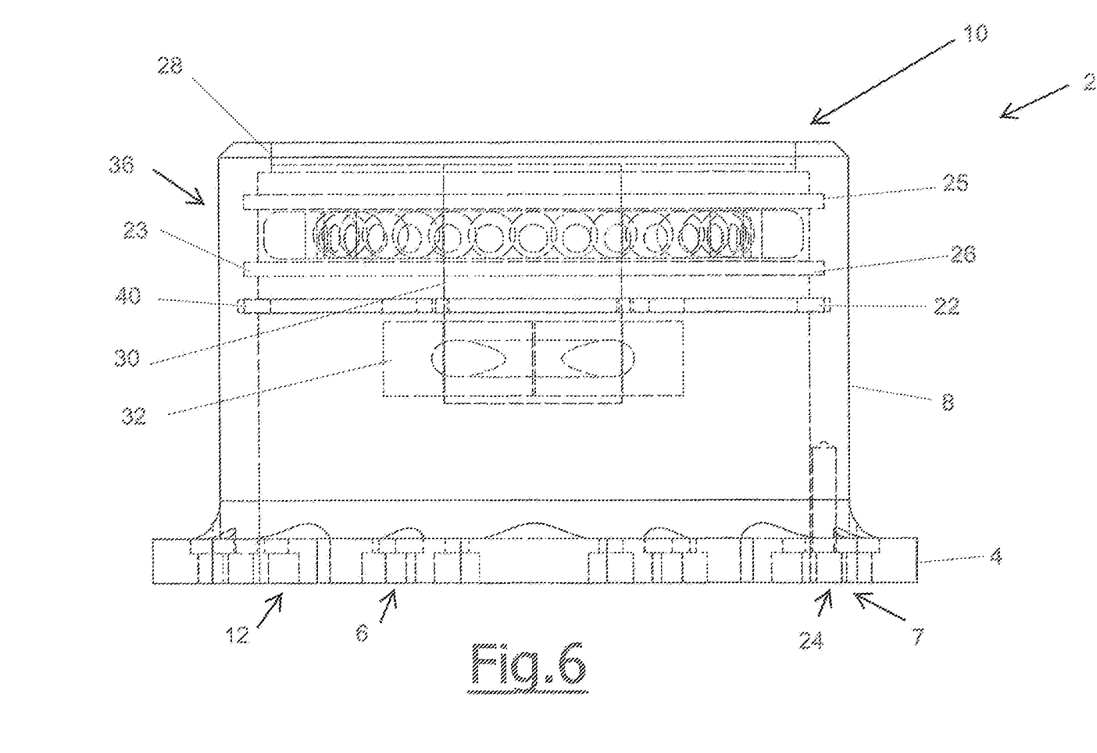
FIG. 6 is a cut-away view, taken along lines 6-6 in FIG. 3, of the modular hub cover, constructed according the present invention.

Reference is made now to FIG. 1, where there is illustrated a modular hub cover 2, wherein the modular hub cover 2 includes, in part, hub cover ring 4, hub cover ring openings 6, hub cover barrel 8, and insert 10. Preferably, hub cover ring 4, hub cover barrel 8, and insert 10 are constructed of any suitable, durable, high strength, and lightweight material such as stainless steel and aluminum. It is to be understood that hub cover ring 4, hub cover barrel 8, and insert 10 should be constructed of any material that will allow the hub cover ring 4, hub cover barrel 8, and insert 10 to be customized through the addition of stylized graphics (not shown) or other similar additions that can be added, as will be discussed in greater detail later. Also, openings 6 are conventionally formed in hub cover ring 4 so that conventional socket head cap screws 12 (FIG. 6) can be used to secure modular hub cover 2 onto a conventional vehicle wheel (not shown) such as a pickup truck wheel. Finally, hub cover ring 4 includes openings 7 (FIG. 2) that are conventionally formed along the inner circumference of hub cover ring 4. As will be discussed later, the openings 7 will allow one end of hub cover barrel 8 to be removably connected to hub cover ring 4 through the use of conventional fasteners 24 (FIG. 6).

A unique aspect of the present invention is the use of the stylized graphics (not shown) that can be placed around the outside of hub cover barrel 8 and, at least, on one side of insert 10. In this manner, the modular hub cover 2 can be customized to a particular user's specifications in order to present a modular hub cover 2 that represents the user's artistic inclinations.

Figure 2:
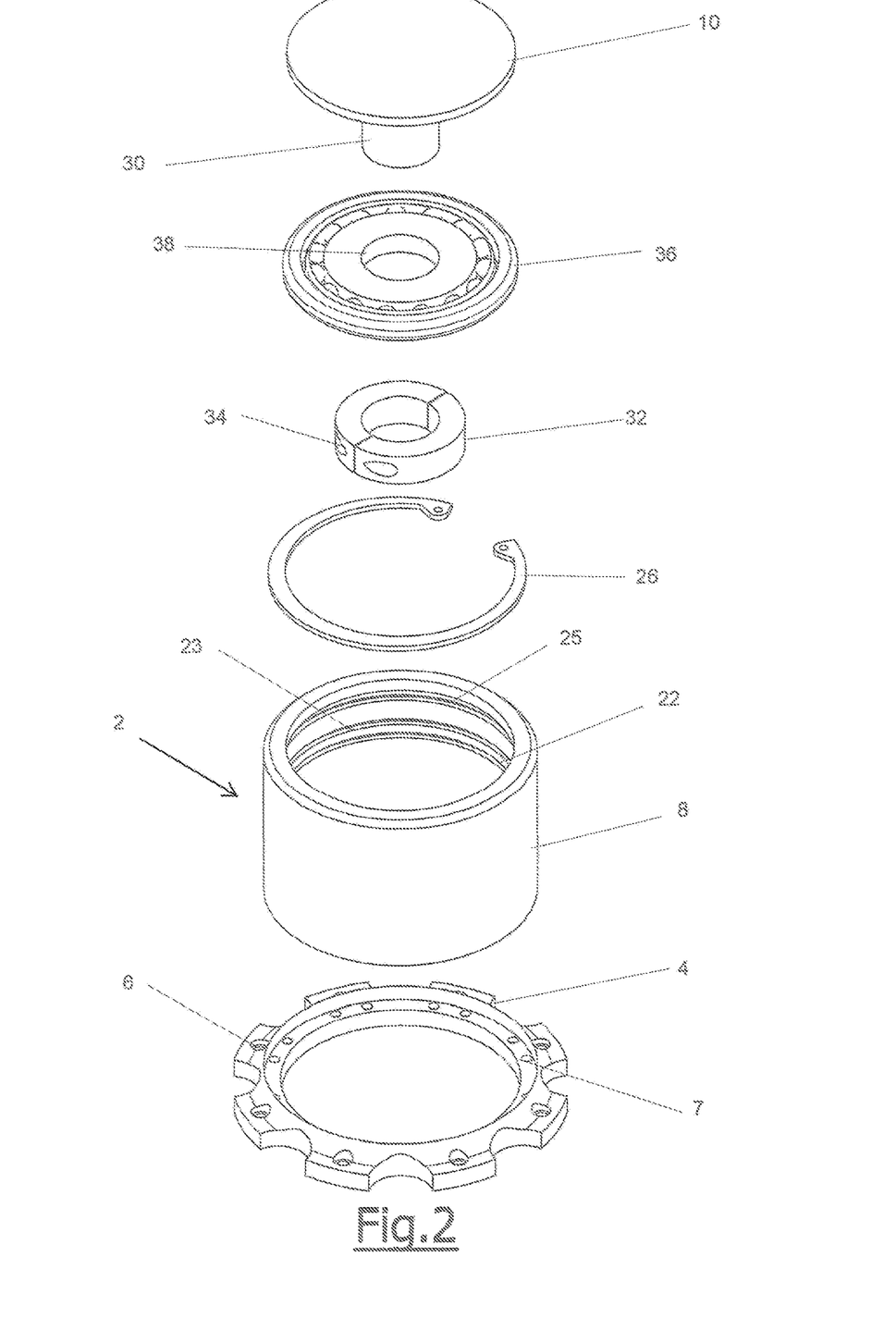
FIG. 2 is an exploded view of the modular hub cover, constructed according the present invention.

With respect to FIG. 2, FIG. 2 shows an exploded view of the modular hub cover 2. In particular, retaining ring 26, insert stem 30, shaft collar 32 having set screw 34, and bearing assembly 36 can be seen. As will be discussed in greater detail later, retaining ring 26 can be used to securely retain insert 10 and bearing assembly 36 within hub cover barrel 8. Preferably, retaining ring 26 is constructed of any suitable, durable, high strength, and lightweight material such as steel. Furthermore, FIG. 2 shows that insert 10 can be securely retained within hub cover barrel 8. Also, insert stem 30 is conventionally attached to one side of insert 10 by conventional fastening techniques such as welding, soldering, adhesives or the like. Preferably, insert stem 30 is constructed of any suitable, durable, high strength, and lightweight material such as steel. Shaft collar 32 is a conventional shaft collar that can be conventionally attached to one end of insert stem 30 through the use of set screw 34, as will be discussed in greater detail later. Bearing assembly 36, preferably, is a conventional bearing assembly that will allow inert 10 and insert stem 30 to easily rotate within the modular hub cover 2, as will be discussed in greater detail later. Finally, grooves 22, 23, and 25, which have been conventionally formed around an inner periphery of hub cover barrel 8, are shown.

Figure 3:
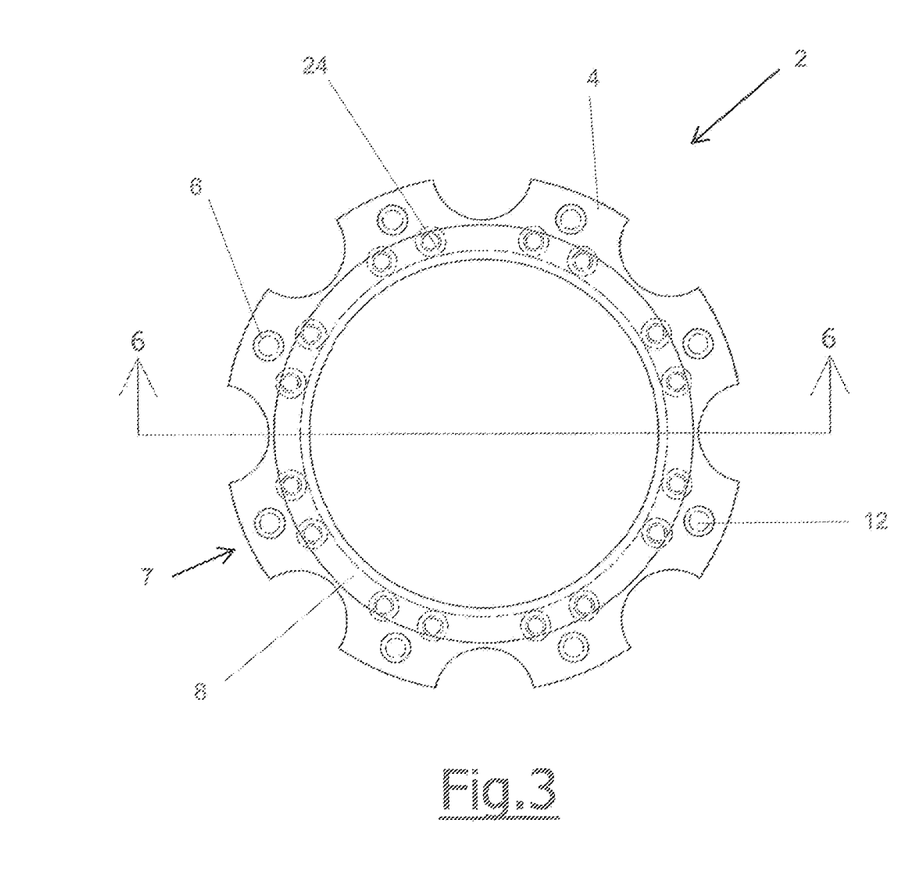
FIG. 3 is a top view of the modular hub cover, constructed according the present invention.

Regarding FIG. 3, FIG. 3 shows a top view of modular hub cover 2. As will be discussed in greater detail later, fasteners 24 are used to removably secure hub cover barrel 8 to hub cover ring 4 (FIG. 6). Also, fasteners 12 are used to removably secure hub cover ring 4 to the vehicle wheel (not shown). Preferably, fasteners 12 and 24 are constructed of any suitable, durable, high strength, and lightweight material such as stainless steel and aluminum.

Figure 4:
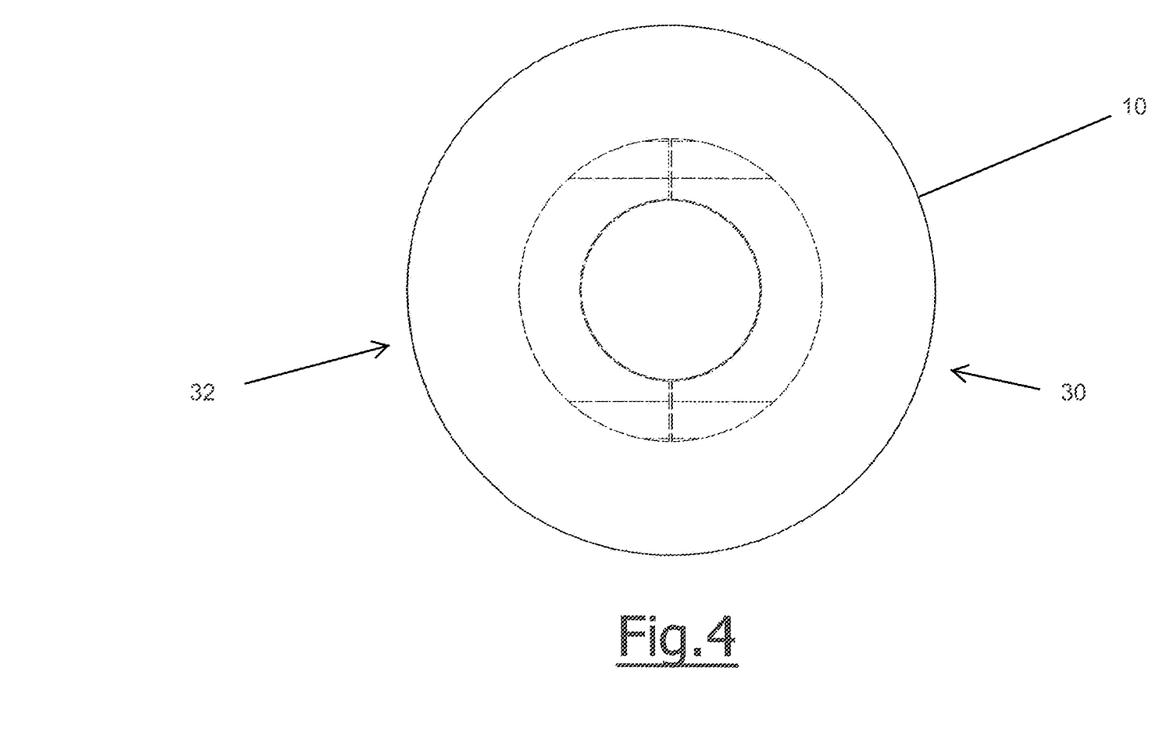
FIG. 4 is a top view of the customizable insert, constructed according the present invention.

With respect to FIG. 4, insert 10 is illustrated. As can be seen in FIG. 4, insert 10, preferably, is circular in shape so that insert 10 is capable of being securely retained with hub cover barrel 8. As discussed earlier, insert 10 can be customized on one or both sides such as with stylized graphics (not shown) or the like. In this manner, insert 10 can be removed from hub cover barrel 8 and flipped over so that the other side of insert 10 (having different stylized graphics (not shown)) can be viewed by the public. It is to be understood that if it is desired to have the insert 10 rotate within modular hub cover 2, one side of the insert 10 may be customized with the stylized graphics (not shown). The insert stem 30 and shaft collar 32 will then be securely attached to the other side of the insert 10, as discussed above.

Figure 5:
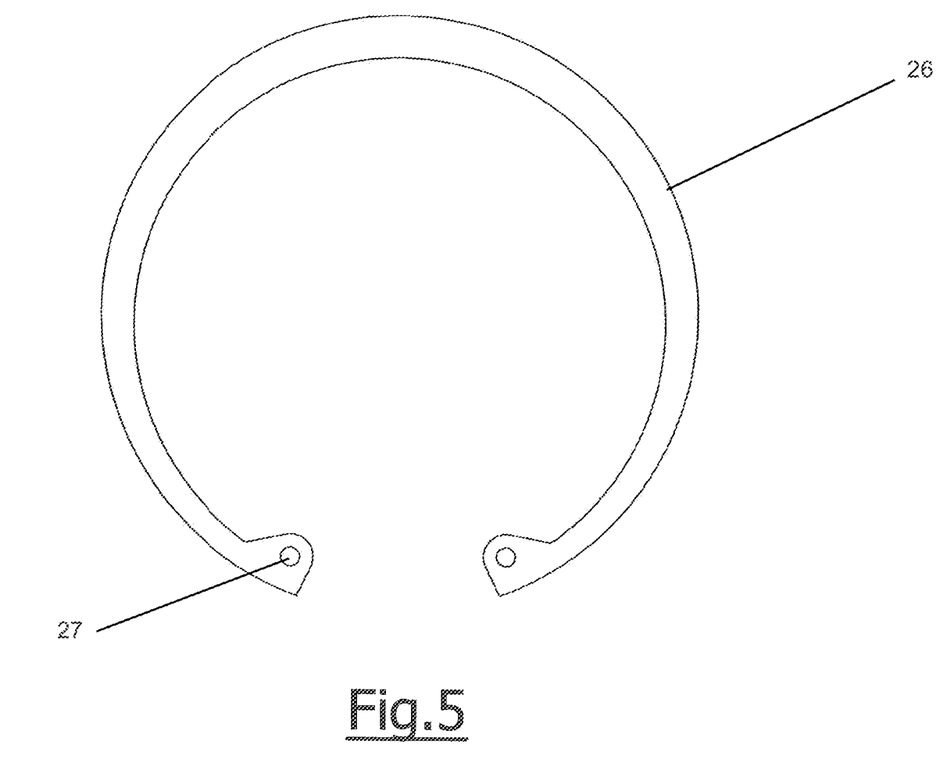
FIG. 5 is a top view of the retaining ring, constructed according the present invention.

Regarding FIG. 5, retaining ring 26 is illustrated. As can be seen in FIG. 5, retaining ring 26, preferably, is circular in shape so that retaining ring 26 is capable of being securely retained within hub cover barrel 8 at grooves 23 or 25. Also, retaining ring 26 includes openings 27 that allow a user to pull the openings 27 towards each other so that retaining ring 26 can be inserted into and removed from grooves 23 or 25, as will be discussed in greater detail later. It is to be understood that the retaining ring 26 can be used to retain the bearing assembly 36 against the bottom of the insert 10 (FIG. 6) so that insert 10 can rotate within modular hub cover 2. In this case, retaining ring 26 would be located within groove 25. If it is not desired to have the insert 10 rotate within modular hub cover 2, a insert 10 that does not include the insert stem 30 and shaft collar 32 can be utilized. In this embodiment, retaining ring 26 would be located within groove 23.

Construction of the Modular Hub Cover

With respect to the construction of the modular hub cover 2, reference is made to FIGS. 1-6. Once the customized, stylized graphics (not shown) have been added to the outside of hub cover barrel 8 and, at least, one side of insert 10, insert 10 is placed inside of hub cover barrel 8 so that a circumferential edge of insert 10 contacts lip 28 (FIG. 6) of hub cover barrel 8. In this manner, the side of insert 10 having the stylized graphics (not shown) that are desired to be viewed by the public are facing outwardly from hub cover barrel 8. Once insert 10 has been placed within hub cover barrel 8, the retaining ring 26 is placed within groove 23 that is located around the inner periphery of hub cover barrel 8, as discussed earlier. In this manner, retaining ring 26 is used to securely retain insert 10 within hub cover barrel 8. It is to be understood that groove 23 is conventionally formed around a portion of the inner periphery of hub cover barrel 8 by conventional techniques such as grinding, milling, forming, or the like.

As discussed above, if it is desired to have the insert 10 rotate within modular hub cover 2, bearing assembly 36 can be integrated into the hub cover barrel 8. As shown in FIG. 6, in this manner, the bearing assembly 36 will allow the insert 10 to float (rotate) in place on top of bearing assembly 36 while the motor vehicle is driven, or otherwise in motion. It is to be understood that in this embodiment, the insert stem 30 is securely attached to one side of the insert 10, as discussed above. The insert stem 30 is then located within the opening 38 (FIG. 2) in the bearing assembly 36. The shaft collar 32 is then conventionally attached to the other end of the insert stern 30. This allows the insert 10 to be securely retained onto the top of bearing assembly 36. The set screw 34 is used to conventionally, securely attach the shaft collar 32 to the one end of insert stem 30. The purpose of the bearing assembly 36 is to allow the insert 10 to easily and smoothly rotate against lip 28 of modular hub cover 2 while the motor vehicle is in motion.

Once the insert 10 has been secured to the inside of hub cover barrel 8 through the use of retaining ring 26, another insert 40 can be located within grooves 22. The another insert 40 can be retained within the groove 22 in a similar manner as described above with respect to insert 10, retaining ring 26, and grooves 23 and 25. In this manner, the another insert 40 can also include stylized graphics, lighting, or any other similar accessory (not shown) that is capable of being viewed by the public. It is to be understood that the groove 22 can also be used to engage a dogg (a geared mechanism that is capable of turning a hub lock) which sits in place of the vehicle's front axle hub engagement locks.

After the insert 10 (and possibly the another insert 40) have been secured within the interior of hub cover barrel 8, hub cover ring 4 is securely attached to the end of hub cover barrel 8 through the use of fasteners 24.

Operation of the Modular Hub Cover

During the operation of modular hub cover 2, the user selects the side of the insert 10 that is to be viewed by the public after the modular hub cover 2 has been installed on the user's vehicle wheel hub (not shown). After the insert 10 has been installed on the inside of hub cover barrel 8 so that the desired side of insert 10 is facing outwards, the user then determines if any other inserts such as insert 40 are to be installed on the inside of hub cover barrel 8. As discussed above, if it is desired to have the insert 10 rotate within modular hub cover 2, bearing assembly 36 can be integrated into the hub cover barrel 8. In this manner, as shown in FIG. 6, the bearing assembly 36 will allow the insert 10 to float (rotate) in place on top of bearing assembly 36 while the motor vehicle is driven, or otherwise in motion. It is to be understood that in this embodiment, the insert stem 30 is securely attached to one side of the insert 10, as discussed above.

After all of the insert and other inserts (if needed) have been installed on the inside of hub cover barrel 8, the hub cover barrel 8 is attached to the hub cover ring 4 through the use of fasteners 24, as discussed earlier.

Once the hub cover barrel 8 has been attached to the hub cover ring 4, the completed modular hub cover 2 is conventionally attached to the vehicle wheel hub (not shown) through the use of socket head cap screws 12. It is to be understood that this procedure should be replicated for each modular hub cover 2 that is to be attached to a wheel of the motor vehicle.

If the user desires to show the stylized graphics (not shown) on the other side of the insert 10, the user simply removes the socket head cap screws 12 from the modular hub cover 2 and the wheel of the motor vehicle. In this embodiment, the insert stem 30 has not been attached to the other side of the insert 10. The user then removes the insert 10 from the inside of the hub cover barrel 8 by conventionally removing the retaining ring 26. The user then flips the insert 10 over so that the other side of the insert 10 will be outwardly facing and can be viewed by the public.

The insert 10 is inserted back into the inside of the hub cover barrel 8. The insert 10 is then securely installed onto the inside of hub cover barrel 8 through the use of retaining ring 26 and groove 23, as discussed earlier.

Once the insert 10 has been re-installed back into the inside of hub cover barrel 8, the modular hub cover 2 is re-installed back onto the hub of the motor vehicle wheel through the use of socket head cap screws 12 as discussed earlier.

A unique aspect of the present invention is the modular aspect of the present invention. If the user desires to change the appearance of the hub cover barrel 8 or the hub cover barrel 8 breaks, the entire modular hub cover 2 does not need to be replaced. In particular, if the user decides to install a different hub cover barrel 8, the user simply removes the socket head cap screws 12 from the modular hub cover 2 and the wheel of the motor vehicle.

The fasteners 24 are removed from hub cover ring 4 so that hub cover barrel 8 is separated from hub cover ring 4. The new hub cover barrel 8 is then installed onto hub cover ring 4 using the fasteners 24. The modular hub cover 2 is re-installed onto the hub of the motor vehicle wheel using socket head cap screws 12, as discussed earlier. In this manner, the user can continue to use the same hub cover ring 4 and just interchange the different hub cover barrels 8 and/or inserts 10.

It is to be understood that the insert 10 can further include an opening or some other similar mechanism (not shown) that will allow for the manual locking hubs on the vehicle wheel (not shown) to be engaged while the modular hub cover 2 is attached to the vehicle wheel. In this manner, the modular hub cover 2 will be constructed so that the manual locking hubs can be activated for the purpose of locking the front axle into four-wheel drive while the modular hub cover 2 is located over the vehicle wheel.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

All of the features disclosed in this specification may be combined in any combination. Thus, unless expressly stated otherwise, each feature disclosed is only an example of a generic series of equivalent or similar features.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

Other modifications and implementations will occur to those skilled in the art without departing from the spirit and the scope of the invention. Accordingly, the description hereinabove is not intended to limit the invention.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps, and that they are not necessarily restricted to the orders of steps indicated herein or in the claims.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Therefore, provided herein is a new and improved modular hub cover, which according to various embodiments of the present invention, offers the following advantages: ease of use; durability; the ability to quickly and easily interchange one hub cover barrel for another hub cover barrel; the ability to customize the hub cover barrel; the ability to customize the insert; the ability of the insert to rotate within the hub cover barrel; and the ability to add other accessories to the hub cover barrel.

In fact, in many of the preferred embodiments, these advantages of ease of use, durability, the ability to quickly and easily interchange one hub cover barrel for another hub cover barrel, the ability to customize the hub cover barrel, the ability to customize the insert, the ability of the insert to rotate within the hub cover barrel, and the ability to add other accessories to the hub cover barrel are optimized to an extent that is considerably higher than heretofore achieved in prior, known vehicle hub covers.

What is claimed is:

1. A modular hub cover, comprising:
    a removable hub cover ring having a plurality of hub cover ring openings located around a periphery of the removable hub cover ring;
    a removable hub cover barrel having a first end and a second end, wherein the first end of the removable hub cover barrel is operatively attached to the removable hub cover ring;
    a removable insert located within the removable hub cover barrel and located adjacent to the second end of the removable hub cover barrel,
        wherein the removable insert further comprises;
        an insert stem having a first end and a second end, wherein the first end of the insert stem is operatively connected to the removable insert,
        a shaft collar operatively connected to the second end of the insert stem, and
        a set screw located on the shaft collar; and
    a retaining ring located within the removable hub cover barrel and located adjacent to the removable insert in order to retain the removable insert within the removable hub cover barrel.

2. The modular hub cover, according to claim 1, wherein the removable hub cover ring further comprises:
    a plurality of openings located along an inner circumference of the removable hub cover ring.

3. The modular hub cover, according to claim 2, wherein the removable hub cover barrel further comprises:
    a plurality of threaded fasteners, wherein each of the plurality of threaded fasteners is operatively attached to the first end of the removable hub cover barrel and is located within one of the plurality of openings located along an inner circumference of the removable hub cover ring.

4. The modular hub cover, according to claim 1, wherein the modular hub cover further comprises:
    a bearing assembly located within the removable hub cover barrel and located between the removable insert and the shaft collar.

5. The modular hub cover, according to claim 1, wherein the modular hub cover further comprises:
    another insert located within the removable hub cover barrel and located adjacent to the removable insert.

6. The modular hub cover, according to claim 1, wherein the modular hub cover further comprises:

at least one groove located around an inner periphery of the removable hub cover barrel.

7. A vehicle hub cover, comprising:
a removable hub cover ring having a plurality of hub cover ring openings located around a periphery of the removable hub cover ring;
a removable hub cover barrel having a first end and a second end, wherein the first end of the removable hub cover barrel is operatively attached to the removable hub cover ring;
a removable insert located within the removable hub cover barrel and located adjacent to the second end of the removable hub cover barrel,
wherein the removable insert further comprises;
an insert stem having a first end and a second end, wherein the first end of the insert stem is operatively connected to the removable insert,
a shaft collar operatively connected to the second end of the insert stem, and
a set screw located on the shaft collar; and
a retaining ring located within the removable hub cover barrel and located adjacent to the removable insert in order to retain the removable insert within the removable hub cover barrel.

8. The vehicle hub cover, according to claim 7, wherein the removable hub cover ring further comprises:
a plurality of openings located along an inner circumference of the removable hub cover ring.

9. The vehicle hub cover, according to claim 8, wherein the removable hub cover barrel further comprises:
a plurality of threaded fasteners, wherein each of the plurality of threaded fasteners is operatively attached to the first end of the removable hub cover barrel and is located within one of the plurality of openings located along an inner circumference of the removable hub cover ring.

10. The vehicle hub cover, according to claim 7, wherein the vehicle hub cover further comprises:
a bearing assembly located within the removable hub cover barrel and located between the removable insert and the shaft collar.

11. The vehicle hub cover, according to claim 7, wherein the vehicle hub cover further comprises:
a second insert located within the removable hub cover barrel and located adjacent to the removable insert.

12. The vehicle hub cover, according to claim 7, wherein the vehicle hub cover further comprises:
at least one groove located around an inner periphery of the removable hub cover barrel.

13. A method of constructing a modular hub cover, comprising the steps of:
providing a removable hub cover ring having a plurality of hub cover ring openings located around a periphery of the removable hub cover ring;
attaching a removable hub cover barrel having a first end and a second end to the removable hub cover ring, wherein the first end of the removable hub cover barrel is operatively attached to the removable hub cover ring;
locating a removable insert within the removable hub cover barrel such that the removable insert is located adjacent to the second end of the removable hub cover barrel,
wherein the removable insert further comprises;
an insert stem having a first end and a second end, wherein the first end of the insert stem is operatively connected to the removable insert,
a shaft collar operatively connected to the second end of the insert stem, and
a set screw located on the shaft collar; and
attaching a retaining ring within the removable hub cover barrel such that the retaining ring is located adjacent to the removable insert in order to retain the removable insert within the removable hub cover barrel.

14. The method, according to claim 13, wherein the removable hub cover ring further comprises:
a plurality of openings located along an inner circumference of the removable hub cover ring.

15. The method, according to claim 14, wherein the removable hub cover barrel further comprises:
a plurality of threaded fasteners, wherein each of the plurality of threaded fasteners is operatively attached to the first end of the removable hub cover barrel and is located within one of the plurality of openings located along an inner circumference of the removable hub cover ring.

16. The method, according to claim 13, wherein the method further comprises:
locating a bearing assembly within the removable hub cover barrel such that the bearing assembly is located between the removable insert and the shaft collar.

17. The method, according to claim 13, wherein the method further comprises:
locating another insert within the removable hub cover barrel such that the another insert is located adjacent to the removable insert.

* * * * *